United States Patent [19]

Grosse-Puppendahl et al.

[11] Patent Number: 5,338,789
[45] Date of Patent: Aug. 16, 1994

[54] FIBER-REINFORCED POLYPHENYLENE ETHER MOLDING COMPOSITIONS AND PROCESS FOR THEIR PREPARATION

[75] Inventors: Thomas Grosse-Puppendahl; Christian Baron, both of Haltern; Friedrich G. Schmidt, Münster, all of Fed. Rep. of Germany

[73] Assignee: Huels Aktiengesellschaft, Marl, Fed. Rep. of Germany

[21] Appl. No.: 865,631

[22] Filed: Apr. 9, 1992

Related U.S. Application Data

[63] Continuation of Ser. No. 591,891, Oct. 2, 1990, abandoned.

[30] Foreign Application Priority Data

Oct. 21, 1989 [DE] Fed. Rep. of Germany ........ 3935169

[51] Int. Cl.$^5$ ............................ C08K 5/11; C08K 5/29; C08K 3/40; C08K 3/04
[52] U.S. Cl. ...................... 524/314; 524/315; 524/321; 525/68; 525/92; 525/133; 525/152; 523/213; 523/214; 523/215
[58] Field of Search ............... 523/213, 214, 215, 508; 524/112, 321, 494, 495, 496, 847, 314, 210, 104, 315; 525/68, 92, 133, 152

[56] References Cited

U.S. PATENT DOCUMENTS

| | | | |
|---|---|---|---|
| 4,131,598 | 12/1978 | Abolins et al | 525/68 |
| 4,152,316 | 5/1979 | Cooper et al. | 525/68 |
| 4,423,189 | 12/1983 | Haaf | 525/92 |
| 4,614,773 | 9/1986 | Sugio et al. | 525/68 |
| 4,647,613 | 3/1987 | Jadamus et al. | 525/68 |
| 4,728,693 | 3/1988 | Droscher et al. | 525/152 |
| 4,749,737 | 6/1988 | van der Meer | 523/214 |
| 4,772,664 | 9/1988 | Ueda et al. | 524/186 |
| 4,873,276 | 10/1989 | Fujii et al. | 524/153 |
| 4,874,810 | 10/1989 | Lee, Jr. et al. | 524/494 |
| 4,892,900 | 1/1990 | Sasaki et al. | 525/133 |
| 4,900,786 | 2/1990 | Abolins et al. | 525/68 |
| 4,929,675 | 5/1990 | Abe et al. | 525/905 |

FOREIGN PATENT DOCUMENTS 0357065 3/1990 European Pat. Off. ........... 524/112

*Primary Examiner*—Paul R. Michl
*Assistant Examiner*—Peter Szekely
*Attorney, Agent, or Firm*—Oblon, Spivak, McClelland, Maier & Neustadt

[57] ABSTRACT

A fiber-reinforced molding composition, comprising:
  a) 97 to 50% by weight, relative to the sum of (a) and (b), of a mixture of 30 to 100 parts by weight of a polyphenylene ether, 0 to 70 parts by weight of a styrene polymer, 0 to 10 parts by weight of a polyoctenylene and 0.1 to 2.5 parts by weight of an $\alpha,\beta$-unsaturated carboxylic acid derivative or a precursor thereof;
  b) 3 to 50% by weight of carbon fibers and/or glass fibers whose surfaces bear functional groups which are capable of entering into chemical coupling reactions with the $\alpha,\beta$-unsaturated carboxylic acid derivatives; and optionally
  c) dyes, pigments, plasticizers, flame retardant additives, processing auxiliaries, other customary additives or combinations thereof.

13 Claims, 1 Drawing Sheet

FIBER-REINFORCED POLYPHENYLENE ETHER MOLDING COMPOSITIONS AND PROCESS FOR THEIR PREPARATION

This application is a continuation of application Ser. No. 07/591,891, filed on Oct. 2, 1990, now abandoned.

BACKGROUND OF THE INVENTION

1. Field of the Invention

The present invention relates to fiber-reinforced molding compositions having superior mechanical properties which are based on polyphenylene ether resins, and also to a process for the preparation of these molding compositions.

2. Description of The Background

Polyphenylene ethers (PPE), also known as polyphenylene oxides, are polymers having a high heat resistance and also good mechanical and electrical properties. As a rule, they are used as blends with polystyrene resins, for example, DE-C-2,119,301 and 2,211,005 and/or polyoctenylene (DE-A-3,442,273 and 3,518,277).

Many attempts have been made to increase the rigidity of PPE-containing molding compositions by admixing reinforcing fibers composed of inorganic or organic material in the resin. For instance, DE-A-2,364,901 discloses polymer mixtures of PPE, polystyrene resins and glass fibers, the glass fibers used in this case having a length of between 3.1 and 25.4 mm, preferably of below 6.35 mm. EP-A-0,243,991 and the corresponding U.S. Pat. No. 4,749,737 describe the mixing of very short, unsized fibers with Si-H bond-containing siloxanes, to improve the fiber-matrix adhesion in the composition, followed by mixing in the melt with PPE and a polystyrene resin.

A specific modification of the fiber surface by treating the glass fibers with vinylsilanes or gamma-glycidoxypropyl-trimethoxysilanes for use in PPE-containing molding compositions is described in DE-A-2,132,595, JP 73/97,954, JP 74/10,826 and JP 85/88,072. DE-A-2,719,305 proposes the opposite method, i.e. end-group modification of the PPE via a silylation carried out before compounding. This technique however is a roundabout and labor-intensive method of achieving an improved fiber-matrix coupling.

A commonly used surface modification of the reinforcing fibers is achieved by treatment with aminoalkylsilanes, for example gamma-aminopropyltriethoxysilane. Glass fibers which have been sized in this manner are incorporated in numerous PPE-containing compositions, it always being necessary to additionally modify the composition of the thermoplastic matrix to bond the fibers to the matrix. For instance, JP 87/15,247 describes the addition of, for example, maleic anhydride-modified polypropylene. JP 85/46,951 describes the addition of ethylene-maleic anhydride copolymers and JP 85/44,535, DE-A-3,246,433 and JP 82/168,938 describe the addition of styrene-maleic anhydride copolymers. However, these polymeric additives have the disadvantage that they reduce the heat resistance of the molding compositions or else they are only partly compatible with the PPE matrix or in most cases are incompatible and therefore impair the mechanical properties of the molding compositions. A need continues to exist for a PPE based molding composition of improved mechanical properties.

SUMMARY OF THE INVENTION

Accordingly, one object of the present invention is to provide fiber-reinforced molding compositions based on PPE, which, while avoiding the disadvantages described above, exhibit an improved adhesion between fiber and matrix.

Briefly, this object and other objects of the present invention as hereinafter will become more readily apparent can be attained by a molding composition comprising a) 97 to 50% by weight, relative to the sum of (a) and (b), of a mixture of 30 to 100 parts by weight of a polyphenylene ether, 0 to 70 parts by weight of a styrene polymer, 0 to 10 parts by weight of a polyoctenylene and 0.1 to 2.5 parts by weight of an $\alpha$-$\beta$-unsaturated carboxylic acid derivative or a precursor thereof;

b) 3 to 50% by weight of carbon fibers and/or glass fibers whose surfaces bear functional groups which are capable of entering into chemical coupling reactions with $\alpha,\beta$-unsaturated carboxylic acid derivatives; and optionally c) dyes, pigments, plasticizers, flame retardant additives, processing auxiliaries, other customary additives or combinations thereof.

DESCRIPTION OF THE DRAWINGS

A more complete understanding of the invention and many of the attendant advantages thereof will be readily obtained as the same becomes better understood by reference to the following detailed description when considered in connection with the accompanying drawings, wherein:

FIGS. 2a and 2b are scanning electron micrographs of the fiber reinforced molding composition of Example 2 of the present invention, wherein FIG. 2b is an enlargement of FIG. 2a.

DETAILED DESCRIPTION OF THE PREFERRED EMBODIMENTS

Figure 1:
FIG. 1 is a scanning electron micrograph of the fiber reinforced molding composition of Comparative Example A.

The molding compositions of the invention can be processed to give molded articles by the customary methods of thermoplastics processing, for example injection molding or press molding. Suitable polyphenylene ethers include primarily polyethers based on 2,6-dimethylphenol, the ether oxygen of one unit being bonded to the benzene nucleus of the adjacent unit. In principle, it is also possible to use other o,o'-dialkylphenols whose alkyl radical preferably contains a maximum of 6 carbon atoms as long as this radical does not have a tertiary carbon atom in the alpha position. Furthermore, it is possible to use phenols which are substituted only in one ortho-position by a tertiary alkyl radical, in particular a tertiary butyl radical. Each of the monomeric phenols listed may be substituted by a methyl group in the 3-position, and optionally also in the 5-position. Obviously, it is also possible to use mixtures of the monomeric phenols mentioned here.

The polyphenylene ethers may be prepared, for example, in the presence of complex-forming agents such as copper bromide and morpholine, from the phenols as disclosed in DE-A-3,224,692 and 3,224,691. The viscosity numbers J, determined in accordance with DIN 53 728 in chloroform at 25° C. are in the range of from 35 to 80 cm$^3$/g (concentration 5 g/l). Preference is given to the polymer of 2,6-dimethylphenol, poly-(2,6-dimethyl-1,4-phenylene ether), having a viscosity number J from 45 to 70 cm³/g. Normally, the polyphenylene ethers are used in the form of powders or granules.

The polyoctenylenes are prepared by the ring-opening or ring-expanding polymerization of cyclooctene (see, for example, A. Draxler, Kautschuk+Gummi, Kunststoffe 1981, pages 185 to 190). Polyoctenylenes having different proportions of cis- and trans-double bonds and also different J-values and correspondingly different molecular weights are obtainable by methods known in the literature. Preference is given to polyoctenylenes having a viscosity number of from 50 to 350 cm³/g, preferably 80 to 160 cm³/g, determined on a 0.1% strength solution in toluene. 55 to 95%, preferably 75 to 85%, of their double bonds are in the trans-configuration.

There are various methods of preparing a mixture of polyphenylene ether and the polyoctenylene. One method is to dissolve the two polymers in a suitable solvent and to isolate the mixture by evaporating off the solvent or by precipitating it with a non-solvent. Another method is to combine the two polymers in the melt. Further details are given in DE-A-3,518,277. In a preferred embodiment, the molding composition contains 1 to 10 parts by weight of polyoctenylene.

α,β-Unsaturated carboxylic acid derivatives are understood to mean, for example, compounds of the formulae (I) and (II):

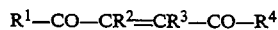

$$R^1-CO-CR^2=CR^3-CO-R^4 \quad (I)$$

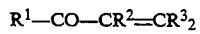

$$R^1-CO-CR^2=CR^3_2 \quad (II)$$

in which $R^1$ and $R^4$ are hydroxyl, aryloxy and/or alkoxy groups having up to 12 carbon atoms or together are —O— or —NR⁵—, $R^2$ and $R^3$ denote hydrogen, an alkyl or cycloalkyl group having up to 12 carbon atoms, an alkyl group substituted by the radical $COR^1$, an aryl group, chlorine or together an alkylene group having up to 12 carbon atoms, while $R^5$ is hydrogen, alkyl, aralkyl or aryl groups, each having up to 12 carbon atoms. Examples of these acids are maleic acid, fumaric acid, itaconic acid, aconitic acid, tetrahydrophthalic acid, methylmaleic acid, maleic anhydride, N-phenyl-maleimide, diethyl fumarate and butyl acrylate. In this selection, preference is given to the use of fumaric acid and maleic anhydride. Obviously, it is also possible to use mixtures.

It is also possible to use precursors of α,β-unsaturated carboxylic acid derivatives of this type which, under the conditions of mixing in the melt, are converted to the said carboxylic acid derivatives by known reactions such as, for example, elimination or reverse Diels-Alder reaction.

Obviously, it is possible to add other compounds which promote the incorporation of the α,β-unsaturated carboxylic acid derivatives, for example, by alternating copolymerization while grafting. Suitable compounds in this category are primarily vinylaromatics such as, for example, styrene, which enter into a reaction of this type in particular with maleic anhydride. The preparation of graft copolymers of this type is described in the German patent application DE-A-3,831,348.

The styrene polymer which is optionally added during the preparation or the working-up of the polyphenylene ether should preferably be compatible with the polyphenylene ether used. Its molecular weight Mw is in the range from 1,500 to 2,000,000, preferably in the range from 70,000 to 1,000,000.

Particularly preferred styrene polymers are polystyrene, impact-modified polystyrene and also styrene-butadiene copolymers. Obviously, mixtures of these polymers may also be used.

The styrene-butadiene copolymers may be random, tapered or block copolymers. The toughness is increased by giving preference to the use of block copolymers of the A-B-A type. The polystyrene blocks A have an average molecular weight Mw of 4,000 to 150,000 and together make up to 33% by weight of the block copolymer. The polybutadiene block B, which may also be hydrogenated or partly hydrogenated, has an average molecular weight Mw of 20,000 to 480,000.

The reinforcing fiber present in the molding composition of the invention bears on its surface preferably free amino, epoxide or isocyanate groups. Amino groups are introduced, for example, by sizing with a copolyamide, with low molecular weight amine compounds or specifically in the use of glass fibers, with gamma-aminopropyltriethoxysilane; epoxide groups by impregnation with uncrosslinked epoxy resins or, in the case of glass fibers, with gamma-glycidoxypropyltrimethoxysilane; isocyanate groups by sizing with a solution of uncrosslinked, preferably low molecular weight polyurethane resins. The components III are preferably used to a maximum amount of 30% by weight, relative to I.

The individual components may be mixed either simultaneously or in succession. Generally, the unreinforced molding composition is initially prepared in granule or melt form and to this is admixed the functionalized fibers in a mixer having a good kneading action. This mixing may for example be carried out using a single or twin-screw kneader or co-kneader. Generally, the mixing temperature is between 250° and 350° C., preferably between 260° and 310° C., and the residence time is generally between 1 and 10 minutes, preferably between 3 and 5 minutes.

The molding compositions of the invention can be processed by customary injection molding procedures under the same conditions as the corresponding prior-art thermoplastic molding compositions. Even large molded objects can be produced simply using the said molding compositions.

The molding compositions of the invention are used to produce moldings which are subject to particular service stress (intermittent and/or constant), a good fiber-matrix adhesion being of crucial importance in these moldings. The molded objects are employed, for example, in the construction of machines and apparatus for example for gear wheels or pump components, in sporting equipment, in the motor vehicle industry or in the electrical industry.

Having generally described this invention, a further understanding can be obtained by reference to certain specific examples which are provided herein for purposes of illustration only and are not intended to be limiting unless otherwise specified.

Comparative Example A 100 parts by weight of polyphenylene ether having a J-value of 68 cm³/g, which has been obtained by oxidative coupling of 2,6-dimethylphenol, termination of the reaction and subsequent combined reaction/extraction in accordance with DE-A-3,313,864 and 3,323,777 followed by evaporation of the solvent and extruding the melt via a degassing extruder, are remelted with 2 parts by weight of diphenylcresyl phosphate (DIS-FLAMOLL® DPK, Bayer) and one part of the antioxidant IRGANOX® 1010 and also 15.6 parts by weight of an NH$_2$ group-bearing carbon fiber (GRAFIL® XAS/PA 6, Courtaulds Advanced Materials), which are metered into the PPE melt in a twin-screw kneader at 280° C. Before the product is discharged, the volatile components are removed in a degassing zone. The product is granulated, dried and injection molded to give test pieces. The properties obtained from these are listed in Table 1. It can be seen clearly from the scanning electron micrograph (SEM) that no adhesion exists between fiber and matrix (low temperature fracture surface) (FIG. 1).

EXAMPLES 1 to 3

Figure 2A:
Figure 2B:

The experiment described in Comparative Example A is repeated but with the addition of 0.5 to 1.5 parts by weight of maleic anhydride to the mixture of PPE, diphenylcresyl phosphate and IRGANOX® 1010 and subsequent metering of the carbon fiber into the melt. The constituents and properties of the composition prepared in this way are listed in Table 1. The scanning electron micrograph from Example 2 shows that an excellent adhesion exists between fiber and matrix (low temperature fracture surface) (FIGS. 2a and 2b).

COMPARATIVE EXAMPLE B

The experiment described in Comparative Example A is repeated but, instead of the carbon fiber used in that example, an epoxy resin-sized carbon fiber (TENAX® HTA-6-CN, Akzo (Enka AG) is used (Table 1).

EXAMPLE 4

The experiment described in Comparative Example B is repeated but, as described in Examples 1 to 3, 1.5 parts of maleic anhydride are additionally used (Table 1).

Obviously, numerous modifications and variations of the present invention are possible in light of the above teachings. It is therefore to be understood that within the scope of the appended claims, the invention may be practiced otherwise than as specifically described herein.

TABLE 1

|  |  | Example |  |  |  |  |  |
|---|---|---|---|---|---|---|---|
|  |  | A | 1 | 2 | 3 | B | 4 |
| PPE | Parts by weight | 100 | 100 | 100 | 100 | 100 | 100 |
| Diphenylcresyl phosphate | Parts by weight | 2 | 2 | 2 | 2 | 2 | 2 |
| IRGANOX® 1010 | Parts by weight | 1 | 1 | 1 | 1 | 1 | 1 |
| Maleic anhydride | Parts by weight | — | 0.5 | 1 | 1.5 | — | 1.5 |
| GRAFIL® XAS/PA 6 | Parts by weight | 15.6 | 15.6 | 15.6 | 15.6 | — | — |
| TENAX® HTA-6-CN | Parts by weight | — | — | — | — | 15.6 | 15.6 |
| Modulus of elasticity in tension DIN 53 457 | MPa | 8600 | 8400 | 9100 | 9200 | 7000 | 9500 |
| Tensile strength DIN 53 455 | MPa | 98 | 117 | 132 | 122 | 92 | 136 |
| Elongation at break DIN 53 455 | % | 1.5 | 1.8 | 1.9 | 2.2 | 1.9 | 1.8 |
| Impact strength DIN 53 453 | kJ/m$^2$ | 13 | 17 | 17 | 13 | 14 | 16 |

What is claimed as new and desired to be secured By Letters Patent of the United States is:

1. A fiber-reinforced thermoplastic molding composition comprising as ingredients:

a) 97 to 50% by weight, relative to the sum of (a) and (b), moldable thermoplastic ingredients, the moldable thermoplastic ingredients in the molding composition consisting of a mixture of 30 to 100 parts by weight of a polyphenylene ether, 0 to 70 parts by weight of a styrene polymer which is polystyrene, impact-modified polystyrene or styrene-butadiene copolymer, 0 to 10 parts by weight of a polyoctenylene and 0.1 to 2.5 parts by weight of a compound of formula (I) or (II)

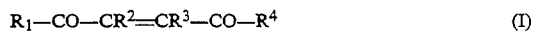

$$R_1-CO-CR^2=CR^3-CO-R^4 \qquad (I)$$

$$R^1-CO-CR^2=CR^3{}_2 \qquad (I)$$

in which $R^1$ and $R^4$ are hydroxyl, aryloxy an/or alkoxy groups having up to 12 carbon atoms or together are —O— or —NR$^5$—, $R^2$ and $R^3$ denote hydrogen or an alkyl or cycloalkyl group having up to 12 carbon atoms, an alkyl group substituted by the radical COR$^1$, an aryl group, chlorine or together an alkylene group having up to 12 carbon atoms, wherein $R^5$ is hydrogen or an alkyl, aralkyl or aryl group, each having up to 12 carbon atoms, a compound which under conditions of mixing in the melt which may be formed during the compounding of the ingredients of the thermoplastic molding composition is converted to a compound of formula (I) or (II) by known reactions, or a compound which is a copolymer of a compound of formula (I) or (II) with a vinyl aromatic, and b) 3 to 50% by weight of carbon fibers and/or glass fibers whose surfaces bear functional groups which are capable of entering into chemical coupling reactions with a compound of formula (I) or (II) or with said copolymer of a compound of formula (I) or (II).

2. The fiber-reinforced thermoplastic molding composition of claim 1 containing a plasticizer.

3. The fiber-reinforced thermoplastic molding composition of claim 2 containing an antioxidant.

4. The fiber-reinforced thermoplastic molding composition of claim 2 containing a pigment.

5. The fiber-reinforced thermoplastic molding composition of claim 2 containing flame retardant.

6. The fiber-reinforced thermoplastic molding composition of claim 2 containing a copolymer of a compound of formula (I) with a vinyl aromatic.

7. The molding composition according to claim 1, wherein the polyphenylene ether is a polyether based on 2,6-dimethylphenol.

8. The molding composition according to claim 1, wherein said composition contains 1 to 10 parts by weight of a polyoctenylene.

9. The molding composition according to claim 1 wherein a compound of formula (I) is present which is fumaric acid, maleic anhydride or combinations thereof.

10. The molding composition according to claim 1, wherein the styrene polymer is partly or completely composed of block copolymers of the A-B-A type, where A denotes a polystyrene block and B denotes a polybutadiene block which may be hydrogenated or unhydrogenated.

11. The molding composition according to claim 1, wherein the fibers surfaces bear free amino, epoxide or isocyanate groups.

12. A process for the preparation of molding compositions according to claim 1, wherein the individual components are mixed in a melt.

13. A molded object produced by the process according to claim 12.

* * * * *